United States Patent [19]

Lekarski et al.

[11] 3,734,131

[45] May 22, 1973

[54] FLUID CONTROLLED LOGIC CIRCUITS

[75] Inventors: Simeon Lekarski, Saint-Cloud; Pierre Hardy; Leon Hardy, Paris, all of France

[73] Assignee: Jean Gachot, Enghien-les-Bains, France

[22] Filed: Dec. 1, 1970

[21] Appl. No.: 93,968

[30] Foreign Application Priority Data

Feb. 12, 1969 France ................................6941589

[52] U.S. Cl...............137/608, 137/815, 235/201 ME

[51] Int. Cl.......................................................F15c 3/04

[58] Field of Search..................137/81.5, 608, 525.1, 137/525.3; 235/201 ME

[56] References Cited

UNITED STATES PATENTS

| | | | |
|---|---|---|---|
| 3,593,734 | 7/1971 | Sanford | 137/81.5 |
| 3,252,481 | 5/1966 | Meier | 137/81.5 |
| 3,534,757 | 10/1970 | Doherty | 137/81.5 |
| 3,539,743 | 11/1970 | Winter | 137/81.5 X |
| 3,550,604 | 12/1970 | Richards et al. | 137/81.5 |
| 3,571,542 | 3/1971 | Madden et al. | 137/81.5 |
| 3,584,639 | 6/1971 | Potepalov et al. | 137/81.5 X |
| 3,587,614 | 6/1971 | Burke | 137/81.5 |
| 3,587,615 | 6/1971 | Thomson | 137/81.5 |
| 3,612,085 | 10/1971 | Clark | 137/81.5 X |

*Primary Examiner*—Samuel Scott
*Attorney*—John Lezdey

[57] ABSTRACT

The invention relates to an improvement in fluid controlled logic circuits comprising a network of fluid circulation conduits and relays for carrying out the logic functions, wherein the circuits are constituted of stacked flat elements in which is made a network of fluid conduits, and which are shaped to constitute the movable members of the relays.

7 Claims, 16 Drawing Figures

Inventors

SIMEON LEKARSKI, PIERRE HARDY + LEON HARDY

By

Attorney

Inventors
SIMEON LEKARSKI, PIERRE HARDY & LEON HARDY
By John Lezdey
Attorney

FLUID CONTROLLED LOGIC CIRCUITS

The present invention relates to an improvement in fluid controlled logic circuits.

Logic circuits are known in which logic elements controlled by a fluid may effect logic operations, like the electronics based devices.

Furthermore, certain logic circuits include fluid relays comprising movable elements, such as trigger circuit relays, relays with one or more diaphragms, slide relays.

These relays comprise a certain number of common advantages particularly a high power of the signal obtained, a small ratio between the motor fluid consumed and the power supplied, an insensitivity to the impurities of the fluid used and a stability of the memory function (by mechanical locking in the slide device).

However, these devices also present numerous disadvantages.

In fact, the relays of known type have a relatively short response time with respect to the static devices.

Furthermore, the dimensions of the relays with movable elements are greater than the dimensions of the static cells and these relays are not suitable for the construction of flat circuits.

Finally, the design of relays with movable elements involves a stacking of a plurality of cast pieces which comprise channels and which form enclosures, this involving a higher cost than that of the static elements and of the electric and electronic devices.

The aim of the present invention is to obtain an improvement in fluid relay devices with movable elements, which enables the above-mentioned disadvantages to be eliminated.

The improved logic circuits according to the invention enable rapid relays to be obtained which are of simple construction and capable of being integrated in flat circuits miniaturised with respect to the existing relays.

In accordance with the present invention, the circuits are constituted of stacked flat elements in which is arranged a network of fluid conduits, and which are shaped to constitute the movable members of the relays.

The use of the same element for the movable member of the relay and for constituting the network of fluid conduits, enables flat logic circuits to be constituted by simple means, which are similar to the printed circuits used in electricity. Furthermore, the use of flat circuits permits a large density of relays per surface unit and a reduction in the lengths of conduits between the relays, this causing a reduction of the parasitic volumes and an improvement in the response time respectively. Finally, the elements which constitute the relays may be made by means of stamped or cut out metallic pieces, cut-out rubber plates and moulded diaphragms, and it is therefore possible to obtain logic circuits at a relatively low cost price.

The invention will be described in greater detail with reference to the accompanying drawings, in which.

FIGS. 12*a* to 12*d* represent a combination of two relays and of an OR element which ensures the function of a trigger circuit memory triggered by successive signals coming from the same input.

Figure 13:
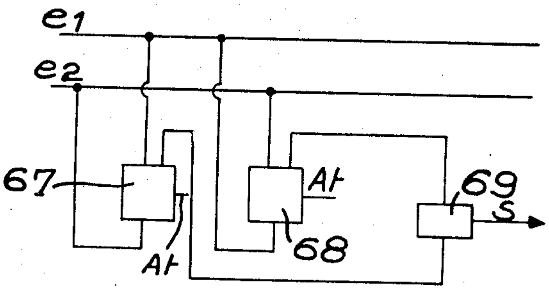

FIG. 13 is a schematic representation of another combination of elements which acts as adding machine without carry over and as exclusive OR logic element.

Figure 1:
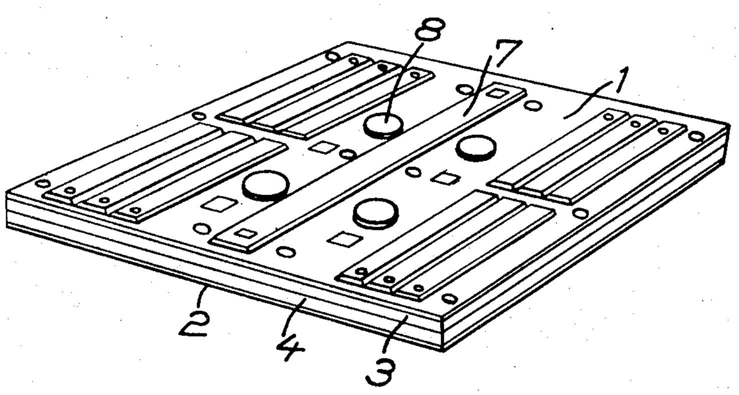
FIG. 1 is a perspective view of a flat logic circuit comprising four NOR elements each provided with the two inputs.

FIG. 1 shows an embodiment of an improved logic circuit according to the invention, which comprises two rigid plates 1 and 2 between which flat elements such as 3 and 4 made of elastic material and particularly of layers of rubber, are maintained tightened by known means.

Figure 2:
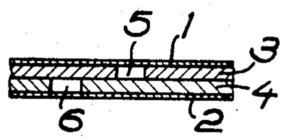
FIG. 2 is a sectional view showing circulation conduits shaped in the thickness of the flat elements constituting the device.

As shown in FIG. 2, the layers 3 and 4 composed of elastic material are cut out in order to present fluid circulation conduits 5 and 6 according to a predetermined shape of a network of conduits.

According to another embodiment (FIG. 1), it is possible to obtain conduits such as 7 by the conformation in relief of at least one of the rigid plates 1, 2, by a stamping operation. In this way, it is possible to obtain a passage of the fluid between the rigid plate 1 and the layer 3 of elastic material which are maintained in sealed contact. It is also possible, in the same manner, to make enclosures 8 for relays which will be described later, by shaping the plates 1 and 2.

Figure 3:
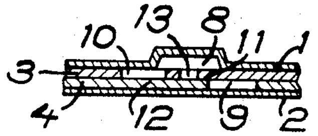
FIG. 3 is a sectional view of a non-return valve.

In the layers 3 and 4 of elastic material, it is possible to provide, in accordance with the invention, a cut-out which enables movable members of relays or a non-return valve, as shown in FIG. 3, to be obtained outside of the fluid circulation conduits.

This non-return valve enables a conduit 9 to be unilaterally connected to a conduit 10 and it comprises in the part 11 of the layer 3 which rests on the part 12 of the layer 4, an aperture 13 located opposite an enclosure 8 shaped in the rigid plate 1, said enclosure being in communication with the conduit 10.

When the pressurised fluid is applied to the conduit 9, it lifts by elastic deformation the edge 11 of the layer 3 and passes through the aperture 13, in order to penetrate by means of the enclosure 8 in the output conduit 10.

Upon a sharp reduction in pressure in the input conduit 9, the difference in pressure $\Delta p$ between the enclosure 8 and the conduit 9 acts on the part 11 of the layer 3 which remains in contact with the layer 4, thus preventing the passage of the fluid from the output aperture 10 towards the input conduit 9.

Figure 4:
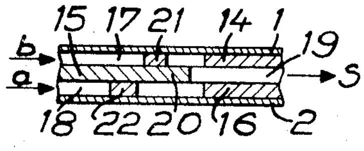
FIG. 4 is a sectional view of an element with OR function with asymmetric return.

FIG. 4 shows a relay permitting the OR function to be carried out and which comprises two rigid plates 1 and 2 between which three layers 14, 15 and 16 of elastic material are arranged.

In the layers 14 and 16 there are respectively provided two conduits 17, 18 and in the median layer 15 a conduit 19. A movable part 20 of the median layer 15 is in abutment against two shifted parts 21, 22, of layers 14 and 15.

In order to carry out the OR function, the relay is branched in the following manner:

the control signal *a* is branched to the conduit 18
the control signal *b* is branched to the conduit 17
the output S is branched to the conduit 19.

| a | b | S | Functioning of the relay |
|---|---|---|---|
| 0 | 0 | 0 | Relay not fed |
| 0 | 1 | 1 | The pressurized fluid in the conduit **17** presses the part **20** of the layer **15** downwardly and the air passes into conduit **19.** The passage in the conduit **18** is prevented by the pressure exerted above the layer **15** pressed against the part **22** of the layer **16.** |
| 1 | 0 | 1 | Similar functioning |
| 1 | 1 | 1 | Similar functioning |

The most noteworthy function of this relay is the asymmetric return. In the case of a fluid feed through conduit 17, if this feed is cut by its connection to exhaust the fluid located in the output conduit 19 escapes through conduit 18 and not through conduit 17. This characteristic of the OR element may be used for effecting extremely simple schemes of memory triggered by successive signals in a single input.

Figure 5:
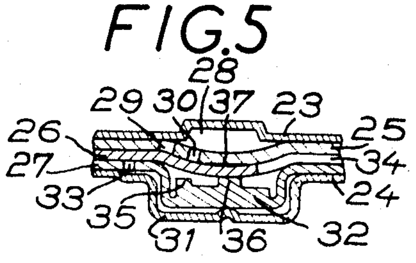
FIG. 5 is a sectional view in open position of a relay with a plurality of functions and with amplification of the input signal.
Figure 6:
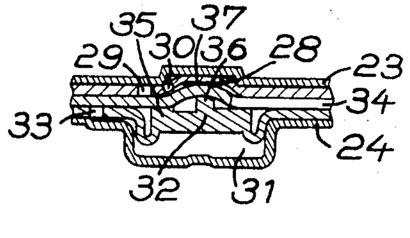
FIG. 6 is a sectional view of the relay of FIG. 5 in closed position.

FIGS. 5 and 6 show a fluid relay with controlled non-return valve. This relay comprises two rigid plates 23 and 24, between which are arranged three layers made of elastic material 25, 26 and 27. The plate 23 has an enclosure 28 capable of communicating with conduits 29 and 30 provided in the elastic layer 25, whilst the plate 24 comprises an enclosure 31 in which a diaphragm 32 provided with beadings 35, 36 and shaped in the layer 27 may move, said enclosure 31 being capable of being placed in communication with a conduit 33 provided in the elastic layer 27. Furthermore, a conduit 34 is provided in the median layer 26 which may be placed in communication with the conduits 29 and 30.

FIG. 5 shows the position of the movable members of the relay when there is no control signal below the diaphragm 32 (rest position). FIG. 6 shows the position of the movable members displaced under the action of the compressed fluid admitted below the diaphragm 32 (operating position).

In the rest position of the relay (FIG. 5), the conduits 29 and 30 are in communication, whilst in the operating position (FIG. 6), the communication between the conduits 29 and 30 is interrupted by the action of the beading 35 on the elastic layer 26.

Furthermore, the communication between the conduits 29 and 24 is cut in the rest position of the relay by the action of the non-return valve identical to that of FIG. 3. In the operating position (FIG. 6), the beading 36 which is pointed in shape, rests on a rigid plate 37 intercalated between elastic layers 25 and 26 and under the action of this support, the seal between the conduits 30 and 34 is broken.

This relay (FIGS. 5 and 6) may carry out the following different logic functions:

NO FUNCTION | $S=\bar{a}$

In this case, the relay is branched as follows:
conduit 29 is branched to the feed A1
enclosure 28 is branched to the output S
conduit 34 is branched towards the atmosphere At
conduit 33 is branched towards the control signal *a.*

A discontinuous signal level 1 corresponds to a high level of pressure and a discontinuous signal level 0 corresponds to a low level of pressure.

The corresponding logic function is:

| a | S |
|---|---|
| 0 | 1 |
| 1 | 0 |

The operation of the relay in the two different states is as follows:

When the control signal *a* which acts below the diaphragm 32 is 0, the feed pressure in the chamber 28 downwardly displaces the layers 25 and 26 (FIG. 5), and in the output S connected to the enclosure 28 the signal is 1.

The passage of the fluid compressed by the conduit 30 towards the atmosphere is prevented by the operation of the layers 25 and 26 as non-return valve.

When the control signal *a* is 1, the diaphragm 32 subjected to the control pressure *a* moves upwardly and by means of the beading 35 holds the layers 25 and 26 in abutment against the flat face of the rigid plate 23. In this way, the communication between the conduit 29 and the enclosure 28 is interrupted. Simultaneously, the diaphragm 32 rests on the rigid plate 37, so that the plate 37, being upwardly displaced, creates a clearance between the layers 25 and 26, and places the enclosure 28 and the atmosphere in communication through conduit 34. The fluid located in the enclosure 28 escapes and the output signal S becomes 0.

The amplification function exists due to the surface difference between the diaphragm 32 (large surface) and the beadings 35, 36 (small surface) in contact with the elastic layer 26.

MEMORY FUNCTION

In order to use the relay (FIG. 5), described hereinabove as memory, it is sufficient to branch the conduit 34 towards the signal *a,* conduit 29 towards output S and conduit 33 towards the control signal *b.* The conduit 29 and the enclosure 28 are permanently connected.

| a | b | S | Functioning of the relay |
|---|---|---|---|
| 0 | 0 | 0 | The relay is not fed |
| 1 | 0 | 1 | The compressed fluid passes through the nonreturn valve and through the aperture **30** towards the output **29.** |
| 0 | 0 | 1 | When the pressure in the input **34** lowers, the valve closes and the pressure in the output **29** maintains its level. |
| 0 | 1 | 0 | The pressure beneath the diaphragm **32** actuates it upwardly and the air escapes through the conduit **34.** |
| 0 | 0 | 0 | The relay is not fed. |

It should be noted that the output signal is maintained in its initial state, even if the feed has been cut.

AND FUNCTION $S=a.b$

In order to effect this, the relay is branched in the following manner:
the control signal $a$ is branched to the enclosure 28.
the output S is branched to the conduit 34
the signal $b$ is branched to the conduit 33
the atmosphere is branched to the conduit 29.

| a | b | S | Functioning of the relay |
|---|---|---|---|
| 0 | 0 | 0 | Relay not fed |
| 0 | 1 | 0 | Relay not fed |
| 1 | 0 | 0 | The pressure in the enclosure **28** is high, the pressure below the diaphragm is low, the non-return valve is closed and the signal (a) escapes to the atmosphere through conduit **29**. |
| 1 | 1 | 1 | The pressure below the diaphragm is high, the passage between the signal (a) and the atmosphere is cut, the pressurized fluid of the enclosure **28** passes through the aperture **30** and is directed towards the output **34**. |

FUNCTION $S=b.\bar{a}$

This function represents a relay with NO function in which the feed is considered as control signal $b$.

NOR FUNCTION

This function is obtained by the junction of the output of an OR relay with two inputs, with the conduit 33 of the relay (FIG. 5) which effects the NO function.

In this way, it has been demonstrated that the relay forming the object of the present invention has multiple logic functions.

If an automatism logic circuit is considered, it must be noted that the different elementary relays may be connected by means of common rigid plates 23, 24 and elastic layers 25, 26, 27. The conduits are made according to the necessities of the circuits in the elastic layers without external communication, as shown in FIGS. 1 and 2.

A schema made in this manner is thus equivalent of an "integrated circuit" in electronics.

Figure 7:
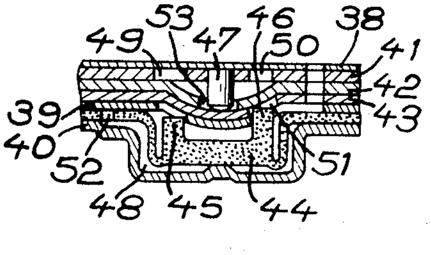
FIG. 7 is a sectional view of another embodiment of a relay in open position.
Figure 8:
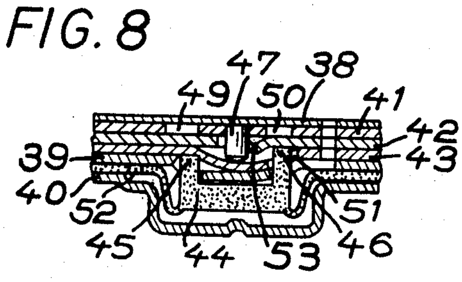
FIG. 8 is a sectional view of the relay of FIG. 7 in closed position.

FIGS. 7 and 8 show another embodiment of a relay which comprises three rigid plates 38, 39 and 40, elastic layers 41, 42, 43 arranged between the plates 38 and 39, a diaphragm 44 provided with two beading 45, 46, the edges of which are held between the plates 39 and 40 and a rigid cylinder 47. The plate 40 is shaped to present an enclosure 48 in which the diaphragm 44 moves.

The relay shown in FIGS. 7 and 8 may ensure all the logic functions described for the relay of FIGS. 5 and 6; by way of example, the NO function is described for the relay of FIGS. 5 and 6; by way of example, the NO function is described hereinbelow in order to illustrate the functioning of this relay.

In this case, the relay is branched as follows:
the feed is branched to conduit 49
the output S is branched to conduit 50
the control signal $a$ is branched to conduit 52
the atmosphere A$t$ is branched to the enclosure 48 above the diaphragm 44.
when the control signal $a$ is 0, the pressurised fluid coming from the conduit 49 displaces the elastic layers 42, 43 and passes through the conduit 50 towards the output. The passage of the compressed fluid through the aperture 51 is prevented by the operation of the layers 42 and 43 acting as non-return valve.
When the control signal $a$ is 1, the diaphragm 44 subjected to the control pressure $a$ moves upwardly and by means of two beadings 45, 46, simultaneously ensures the following two roles:
one of the beadings 45 cuts the passage of the fluid between the conduits 49 and 50 and the other beading 46 breaks the non-return function of the layers 42 and 43, so that the fluid located in the output conduit 50 passes through the apertures 53 and 51 in order to escape towards the atmosphere.

Figure 9:
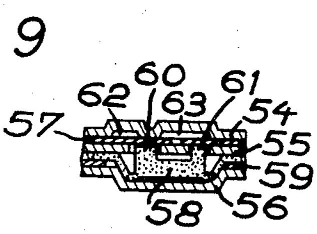
FIG. 9 is a sectional view of another embodiment of a relay operating according to the same principle as the preceding ones.

FIG. 9 shows another embodiment of a relay whose operation is similar to that of the relay of FIGS. 7 and 8 described hereinabove.

This relay comprises three rigid plates 54, 55 and 56, an elastic layer 57 held between the plates 54 and 55, a diaphragm 58 whose edges are held between the plates 55, 56, as well as an elastic layer 59.

The diaphragm 58 has two beadings 60, 61 which act on the elastic layer 57 by openings provided in the plate 55. Conduits 62, 63 are shaped in the rigid plate 54.

Figure 10:
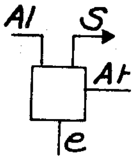
FIG. 10 is a schematic representation of a relay with connections which determine the NO function.

FIG. 10 shows a relay with a branching which determines a precise logic function and in which A1 corresponds to the fluid feed, S to the output, A$t$ to the connection with the atmosphere and $e$ to the control signal.

Figure 11:
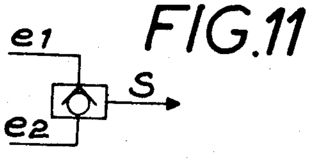
FIG. 11 is a schematic representation of an OR element with asymmetric return.
Figure 12A:
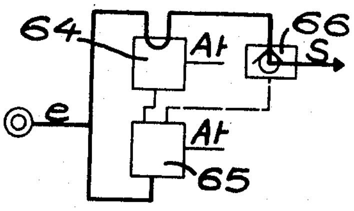
Figure 12C:
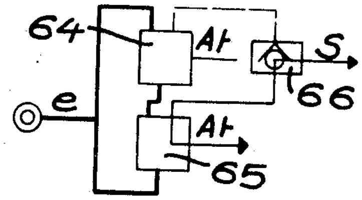
Figure 12B:
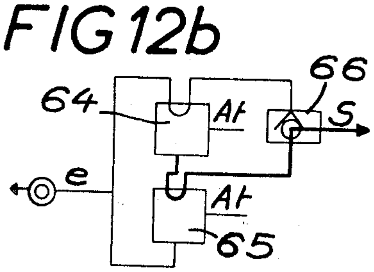
Figure 12D:
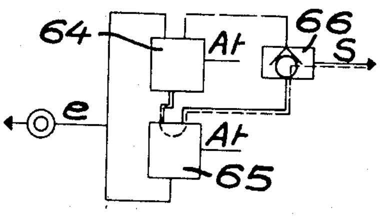

FIG. 11 shows an OR element branched at $e$.1 to a control signal, at $e$.2 to another signal and at S to the output.

In FIGS. 12$a$, 12$b$, 12$c$, 12$d$, two relays 64, 65 and an OR element 66 have been associated, which are branched so as to effect a trigger circuit memory which has the following logic function:

| e | S |
|---|---|
| 1 | 1 |
| 0 | 1 |
| 1 | 0 |
| 0 | 0 |

In the position shown in FIG. 12$a$, the signal $e$ is equal to 1 and, the relay 64 being in rest position, the signal passes through the relay 64 and the OR element 66 towards the output. The relay 65 is in operating position without feed with output = 0.

In the position shown in FIG. 12$b$, the signal $e$ is cut and becomes equal to 0, the signal of the output of the element 66 not being able to escape through the relay 64, due to the asymmetric operation of the OR element 66, the signal of the output S.1 is directed towards the control of the relay 64 by the relay 65 which is at rest. Thus the complete escape of the relay 64 is obtained and the signal S = 1 is maintained.

In the position of FIG. 12$c$, a new signal transmitted by the input $e$ = 1, cannot pass through the relay 64 which is in operating position and the relay 65 permits the escape of the fluid of the output S to the atmosphere. The feed pressure of the element 65 is maintained and the signal S= 0.

Finally, in the position of FIG. 12$d$, for which no input signal $e$ is transmitted, the escape of the control of the relay 65 and the feed of the relay 64 are provoked. The quantity of fluid imprisoned in the control of the relay 64 and the feed of 65 expands in the output capacity, diminishing the value of the pressure below the value of the minimum pressure of the control signal.

This memory does not have an imposed operational rhythm, the time during which the control signal takes the value 0 or 1 may be different without limit. This memory which has the advantage of being a static memory, enables the system to remain in the initial state after the feed has been cut.

FIG. 13 shows another schema in which two relays 67 and 68 and an OR element 69 are associated in order to obtain a function of adding machine without carry over.

The logic function of this schema is as follows:

| e.1 | e.2 | S |
|---|---|---|
| 0 | 0 | 0 |
| 0 | 1 | 1 |
| 1 | 0 | 1 |
| 1 | 1 | 0 |

Of course, the invention is not limited to the sole embodiment described and shown, but covers on the contrary all the variants thereto.

We claim:

1. An improvement in fluid controlled logic circuits comprising a network of fluid circulation conduits and relays for carrying out the logic functions, wherein said circuits comprise stacked flat elements in which is made a network of fluid conduits, and which are shaped to constitute the movable members of the relays, each circuit comprising at least two rigid plates between which are arranged flat elements consisting of a plurality of layers of elastic material which are cut out in order to present openings corresponding to the fluid passage conduits and members constituting the relays which are used in combination with diaphragms.

2. An improvement in fluid controlled logic circuits comprising a network of fluid circulation conduits and relays for carrying out the logic functions, wherein said circuits comprise stacked flat elements in which is made a net work of fluid conduits, and which are shaped to constitute the movable members of the relays, each circuit comprising at least two rigid plates between which are arranged flat elements constituted by layers of elastic material which are cut out in order to present openings corresponding to the fluid passage conduits and members constituting the relays which are used in combination with diaphragms, and wherein the rigid plates are shaped to present channels corresponding to the fluid conduits and enclosures corresponding to the relays and one of the elements of the logic circuit being a non-return valve comprising at least one layer of elastic material arranged between two rigid plates; one of the elastic layers having a conduit and one of the plates having an aperture normally closed by the wall of the other layer arranged below an enclosure shaped in one of the rigid plates and in permanent communication with one of the conduits and the relays for carrying out the logic or function with asymmetric return comprises at least one layer of elastic material arranged between two rigid plates, the two plates each comprising an inlet conduit and the median layer an outlet conduit, said median layer comprising a movable part in abutment against two shifted parts of the outer layers.

3. An improvement in logic circuits as claimed in claim 2 wherein the relays with logic functions are constituted of at least two rigid outer plates and a stack of flexible layers which comprises at least one passage between two conduits capable of being interrupted by the action of a localized surface of a diaphragm and at least one non-return valve capable of being controlled by other localized furfaces of the same diaphragm.

4. An improvement in logic circuits as claimed in claim 2, wherein one of the relays consists of three elastic layers arranged between two rigid plates, one of said plates comprises an enclosure capable of communicating with two conduits provided in one of the outer elastic layers and the other of said plates comprises an enclosure in which a diaphragm is capable of moving, which is subjected on one of its faces to the action of the fluid coming from a conduit provided in the other outer elastic layer, said diaphragm having two beadings capable of coming into contact with the median elastic layer which also comprises a conduit.

5. An improvement in logic circuits as claimed in claim 2, wherein one of the relays comprises two rigid plates between which are arranged three elastic layers comprising different conduits, a rigid plate and a diaphragm, one of the outer elastic layers comprising a rigid cylinder capable of coming into contact with one of the elastic layers and the diaphragm comprising two beadings capable of coming into contact with one of the elastic layers by openings provided in the intermediary rigid plate.

6. An improvement in logic circuits as claimed in claim 2, wherein one of the relays comprises two rigid plates between which are arranged, in order, an elastic layer comprising conduits, a rigid plate, a diaphragm provided with two beadings and an outer rigid plate.

7. An improvement in logic circuits as claimed in claim 2, wherein two relays and an OR element are associated in order to obtain a trigger circuit memory from a single feed.

* * * * *